(12) United States Patent
Kim et al.

(10) Patent No.: US 8,205,653 B2
(45) Date of Patent: Jun. 26, 2012

(54) APPARATUS FOR ATTACHING SUBSTRATES

(75) Inventors: Dong Gun Kim, Seongnam-si (KR); Bong Hwan Choi, Seongnam-si (KR)

(73) Assignee: Advanced Display Process Engineering, Co., Ltd., Seongnam-si (KR)

( * ) Notice: Subject to any disclaimer, the term of this patent is extended or adjusted under 35 U.S.C. 154(b) by 334 days.

(21) Appl. No.: 12/260,652

(22) Filed: Oct. 29, 2008

(65) Prior Publication Data

US 2009/0114350 A1 May 7, 2009

(30) Foreign Application Priority Data

Nov. 2, 2007 (KR) .................. 10-2007-0111671

(51) Int. Cl.
*B29C 65/00* (2006.01)
*B29C 65/08* (2006.01)
*B32B 37/00* (2006.01)
*B32B 38/04* (2006.01)
*B32B 41/00* (2006.01)
*G05G 15/00* (2006.01)
*B65C 9/40* (2006.01)
*B23K 37/00* (2006.01)
*B30B 5/02* (2006.01)
*B30B 5/04* (2006.01)
*B30B 15/34* (2006.01)

(52) U.S. Cl. ........ 156/349; 156/381; 156/382; 156/261; 156/358; 156/580; 156/581; 156/583.1

(58) Field of Classification Search .................. 156/349, 156/381–382, 261, 358, 580, 581, 583.1
See application file for complete search history.

(56) References Cited

U.S. PATENT DOCUMENTS

| | | | |
|---|---|---|---|
| 4,908,087 A * | 3/1990 | Murooka et al. | 156/286 |
| 2005/0011606 A1* | 1/2005 | Lee et al. | 156/228 |
| 2005/0022938 A1* | 2/2005 | Masuda | 156/580 |
| 2005/0199346 A1* | 9/2005 | Miyajima et al. | 156/538 |

* cited by examiner

*Primary Examiner* — Khanh P Nguyen
*Assistant Examiner* — Matthew Hoover
(74) *Attorney, Agent, or Firm* — KED & Associates, LLP

(57) ABSTRACT

A substrate bonding apparatus and method are provided. The substrate bonding apparatus may include a first support member that receives a first substrate, a second support member that receives a second substrate opposite the first support member, and a support pin located at the outside of the first substrate fixed to the first support member. The support pin may be connected to the first support member, and a distance adjustment device may move the support pin upward or downward to adjust the distance between the first support member and the second support member.

14 Claims, 9 Drawing Sheets

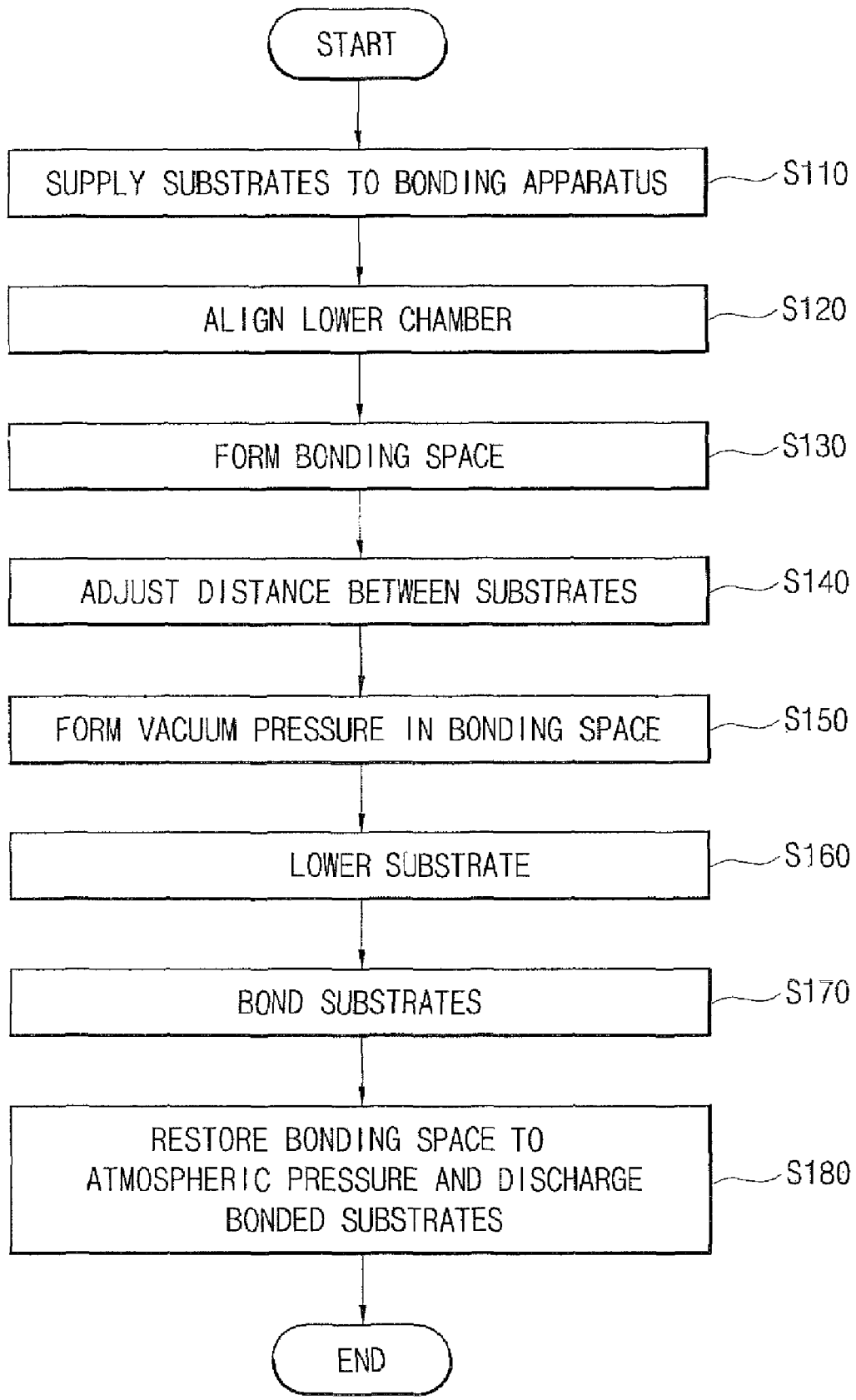

APPARATUS FOR ATTACHING SUBSTRATES

BACKGROUND

1. Field

A substrate bonding apparatus is provided, and more particularly, a substrate bonding apparatus that is used in the manufacture of flat display panels is provided.

2. Background

With the development of an information technology based society, demands for display devices have increased. Various flat display devices, such as liquid crystal displays (LCD), plasma display panels (PDP), and electro luminescent displays (ELD), are being widely used.

Among them, the LCD is widely used in mobile applications because of its excellent image quality, small weight, small thickness, and low power consumption, as compared with older cathode ray tube (CRT) technology. When manufacturing a liquid crystal display panel used for an LCD, a process for bonding an array substrate and a color filter substrate may be an important factor in determining the quality of the LCD.

BRIEF DESCRIPTION OF THE DRAWINGS

The embodiments will be described in detail with reference to the following drawings in which like reference numerals refer to like elements wherein:

FIG. 9 is a flow chart of an operation of the substrate bonding apparatus as embodied and broadly described herein.

DETAILED DESCRIPTION

Hereinafter, exemplary embodiments will be described in more detail with reference to FIGS. 1 to 9. These exemplary embodiments may be modified in various forms, and thus the scope should not be interpreted to be limited by these exemplary embodiments.

A thin film transistor (TFT)-LCD panel may be prepared by preparing an array substrate having a plurality of thin film transistors arranged in a matrix, preparing a color filter substrate having a color filter or a light shielding film formed thereon, bonding the color filter substrate to the array substrate such that the color filter substrate is opposite the array substrate while maintaining a predetermined distance of several μm between the color filter substrate and the array substrate, injecting a liquid crystal between the color filter substrate and the array substrate before the bonding, during the bonding, or after the bonding, and encapsulating the bonded color filter substrate and array substrate.

The substrate bonding process may be carried out by a substrate bonding apparatus including an upper chamber and a lower chamber, and creating a vacuum in an interior space defined by the upper and lower chambers. The substrates may be fixed to the upper and lower chambers, and may be moved to adjust a distance between the substrates and to adjust an alignment of the substrates. A board, a chuck and an alignment device may be provided in each chamber to prevent structural deformation of the chambers from affecting the substrates, and also to align and adjust the distance between the substrates.

Figure 1:
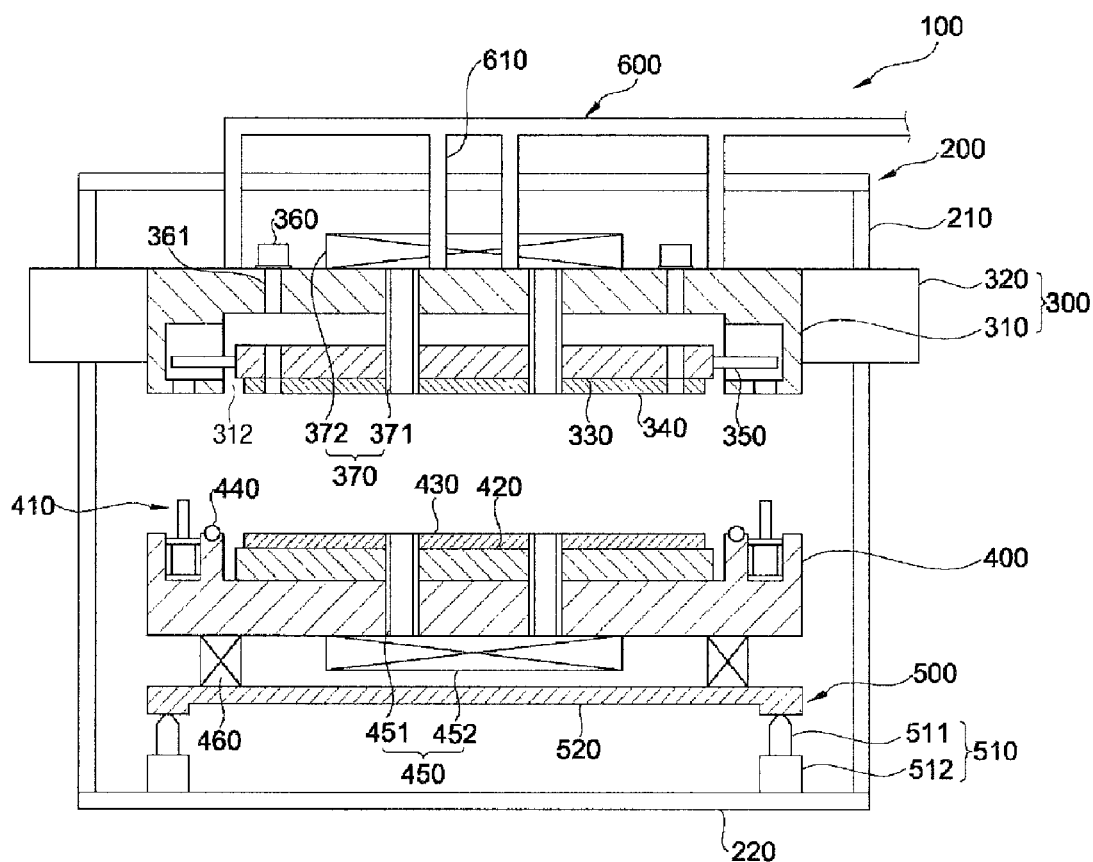
FIG. 1 is a sectional view of a substrate bonding apparatus as embodied and broadly described herein.

An exemplary substrate bonding apparatus 100 as embodied and broadly described herein is shown in FIG. 1. The substrate bonding apparatus 100 may include a frame 200, an upper chamber 300, a lower chamber 400, and a driver 500.

The frame 200 forms an external appearance of the substrate bonding apparatus 100 and supports respective components of the substrate bonding apparatus 100. The frame 200 includes a plurality of posts 210 that define a lower part of the frame 200, the posts 210 being fixed to the edge of a base 220. The base 220 supports the driver 500. Additional beams (not shown) and stays (not shown) may be provided between adjacent posts 210 to increase the strength of the structural rigidity provided by the posts 210.

The upper chamber 300 may be coupled to the upper part of the frame 200, and may be brought into tight contact with the lower chamber 400 to define a bonding space. The upper chamber 300 may include an upper chamber body 310 configured to be brought into tight contact with the lower chamber 400 to define the bonding space, and a plurality of support bars 320 that protrude out from the upper chamber body 310 to allow the posts 210 of the frame 200 to extend therethrough such that the posts 210 are received by and coupled to the support bars 320.

The upper chamber body 310 may include an opening 312 formed in the lower part thereof to receive an upper support member. The upper support member may include an upper board 330 and an upper chuck 340 disposed at the bottom of the upper board 330. The upper chuck 340 may be formed in the shape of a plate. A first substrate P1 may be placed on a receiving surface of the upper chuck 340. The upper chuck 340 may be an electrostatic chuck to support the first substrate P1 using an electrostatic force, or other type of chuck as appropriate. In alternative embodiments, the upper board 330 may be integrally formed with the upper chuck 340. In this case, the upper board 330 may hold the first substrate P1.

A support pin 350 may protrude from an outer end of the upper board 330, and may be arranged substantially parallel to one side of the first substrate P1 fixed to the upper chuck 340. The support pin 350 may be supported by a push rod 412, which will be described later.

A camera 360 may be provided at the top of the upper chamber body 310 to adjust the relative positions between the first substrate P1 and a second substrate P2. Other locations for the camera 360 may also be appropriate. A substrate separator 370 may also be provided with the upper chamber 310 to suction or pressurize the first substrate P1 such that the first substrate P1 may be fixed to or separated from the upper chuck 340.

The camera 360 may observe alignment between the first substrate P1 fixed to the upper chuck 340 and a second substrate P2, which will be described later, through a throughhole 361 formed in the upper chamber body 310 and the upper board 330. For example, the camera 360 may observe alignment marks (not shown) provided on the first substrate P1 and the second substrate P2 while overlapping the first substrate P1 and the second substrate P2. The camera 360 may also observe at least two diagonal corners of the first substrate P1 and the second substrate P2 while overlapping the first substrate P1 and the second substrate P2.

The substrate separator 370 may include a plurality of separation pins 371 extending through the upper chamber body 310 and the upper board 330, and a separation pin actuating member 372 disposed at the outside of the upper chamber body 310 to move the separation pins 371 upward or downward. Each separation pin 371 may be formed in the shape of a hollow pipe. The separation pins 371 may be connected to an exhaust device 600 so that the separation pins 371 may apply a suction force to the first substrate P1 when vacuum pressure is created in the separation pins 371 by the exhaust device 600.

The exhaust device 600 may create vacuum pressure in the bonding space defined between the upper chamber body 310 and the lower chamber 400. The exhaust device 600 may include an exhaust pipe 610 communicating with the bonding space defined between the upper chamber body 310 and the lower chamber 400 and a vacuum pump (not shown) to create vacuum pressure in the bonding space through the exhaust pipe 610. The vacuum pump may be connected to the exhaust pipe 610 such that an $N_2$ process gas used during bonding may be supplied simultaneously with the creation of the vacuum pressure. Alternatively, a pressurized gas may be supplied into the exhaust pipe 610 such that the pressure in the bonding space is changed into an atmospheric pressure.

The lower chamber 400 is disposed below the upper chamber 300. The lower chamber 400 may be moved toward the upper chamber 300 such that the lower chamber 400 is brought into tight contact with the upper chamber body 310 to define the bonding space. At the top of the lower chamber 400, a lower support member may be provided, including a lower board 420 and a lower chuck 430 provided at the top of the lower board 420 to support the second substrate P2. The lower chuck 430 may be an electrostatic chuck to fix the second substrate P2 using an electrostatic force, or other type of chuck, as appropriate. In alternative embodiments, the lower board 420 may be integrally formed with the lower chuck 430. In this case, the lower board 420 may hold the second substrate P2.

A sealing member 440 may be provided between corresponding edges of the upper and lower chambers 300 and 400 so as to contact the bottom of the upper chamber body 310 and tightly seal the bonding space.

A distance adjustment device 410 may also be provided at the edge of the lower chamber 400 to support the support pin 350, which protrudes outward from the upper board 330 through the upper chamber body 310, and to adjust the distance between the upper board 330 and the lower board 420.

A substrate movement device 450 may be provided at the bottom of the lower chamber 400 to fix the second substrate P2 to the lower chuck 430 or to separate the second substrate P2 from the lower chuck 430. The substrate movement device 450 may include a plurality of pins 451 extending through the lower chamber 400 and an actuating member 452 disposed at the outside of the lower chamber 400 to move the pins 451 upward or downward.

Position adjustment stages 460 supported by the driver 500 may adjust the position of the lower chamber 400 and thus align the upper chamber body 310 and the lower chamber 400.

The driver 500 may be disposed at the lower part of the frame 200 to move the lower chamber 400 toward and away from the upper chamber 300 such that the bonding space is opened and closed. The driver 500 may include a plurality of movement devices 510 installed at the edge of the base 220 and a plate 520 supported by the movement devices 510.

Each movement device 510 may include a post 511 to support the plate 520 and a movement member 512 to move the post 511 upward or downward. The movement member 512 may be a hydraulic cylinder (not shown) to generate power necessary to directly move the plate 520 upward or downward. Alternatively, the movement member 512 may be a combination of a motor (not shown), a speed reducer (not shown) to convert the direction of the power generated from the motor and, at the same time, reduce the speed of the power, and a screw assembly (not shown) to convert the rotational movement of the speed reducer into a rectilinear movement. The movement member 512 may be constructed in various structures, and is not limited by the above-mentioned structures.

Figure 2:
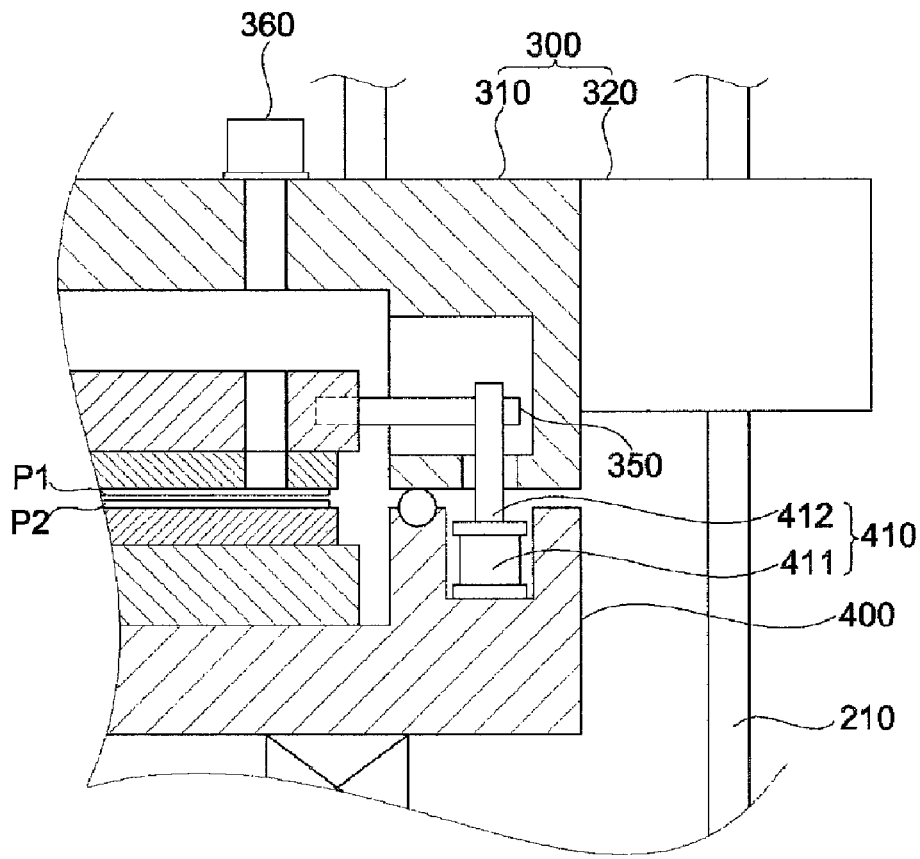
FIG. 2 is a front sectional view of an interior structure of a distance adjustment device of the substrate bonding apparatus as embodied and broadly described herein.
Figure 3:
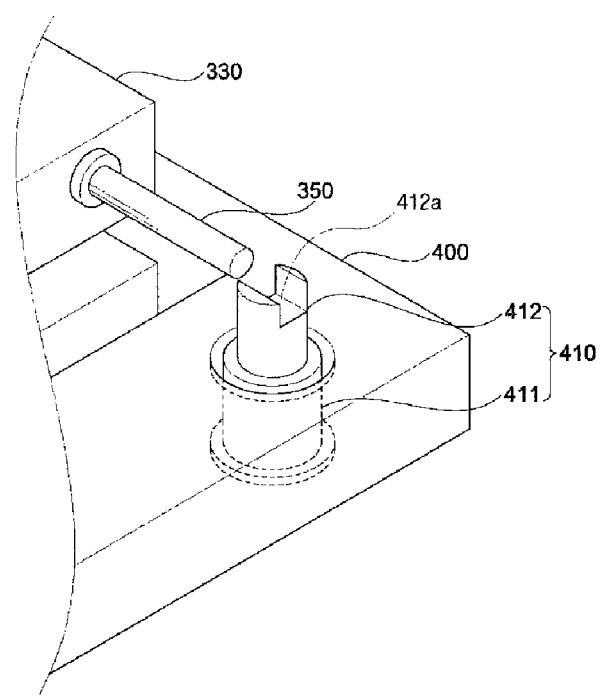
FIG. 3 is a partial perspective view of the distance adjustment device shown in FIG. 2.
Figure 4:
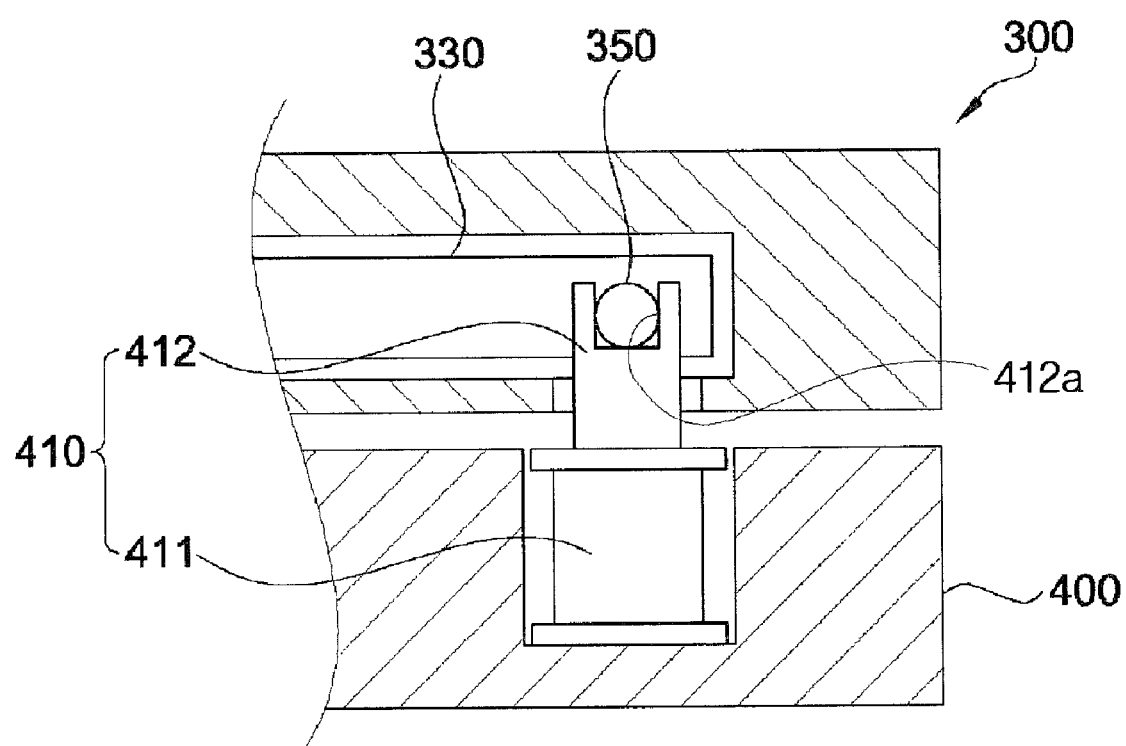
FIG. 4 is a side sectional view of the distance adjustment device shown in FIG. 2.

Hereinafter, a distance adjustment device 410 as embodied and broadly described herein will be more fully described with reference to FIGS. 2 to 4. The distance adjustment device 410 may support a plurality of support pins 350 provided at the upper board 330. The distance adjustment device 410 may include an actuator 411 and a push rod 412.

The actuator 411 may be installed at the edge of the lower chamber 400 to move the push rod 412 upward or downward. The push rod 412 may support the corresponding support pin 350, and may be moved upward or downward by the actuator 411.

A groove 412a may be formed in the upper end of the push rod 412 to receive the corresponding support pin 350 disposed at the upper board 330. The groove 412a may be substantially parallel to one side of the second substrate P2 fixed to the lower board 420 (or substantially parallel to the support pin 350 or one side of the first substrate P1), i.e., as shown in FIG. 3, the groove 412a may be parallel to a longitudinal axis of the first and second substrates P1 and P2 and/or upper and lower boards 330 and 420. Consequently, the push rod 412 may prevent the corresponding support pin 350 from moving in the direction substantially perpendicular to the support pin 350. Although the groove 412a shown in FIGS. 3-4 is formed in the upper end of the push rod 412 in this embodiment, the shape of the upper end of the push rod 412 may be modified so long as the corresponding support pin 350 is prevented from moving in the direction substantially perpendicular to the support pin 350.

Figure 5:
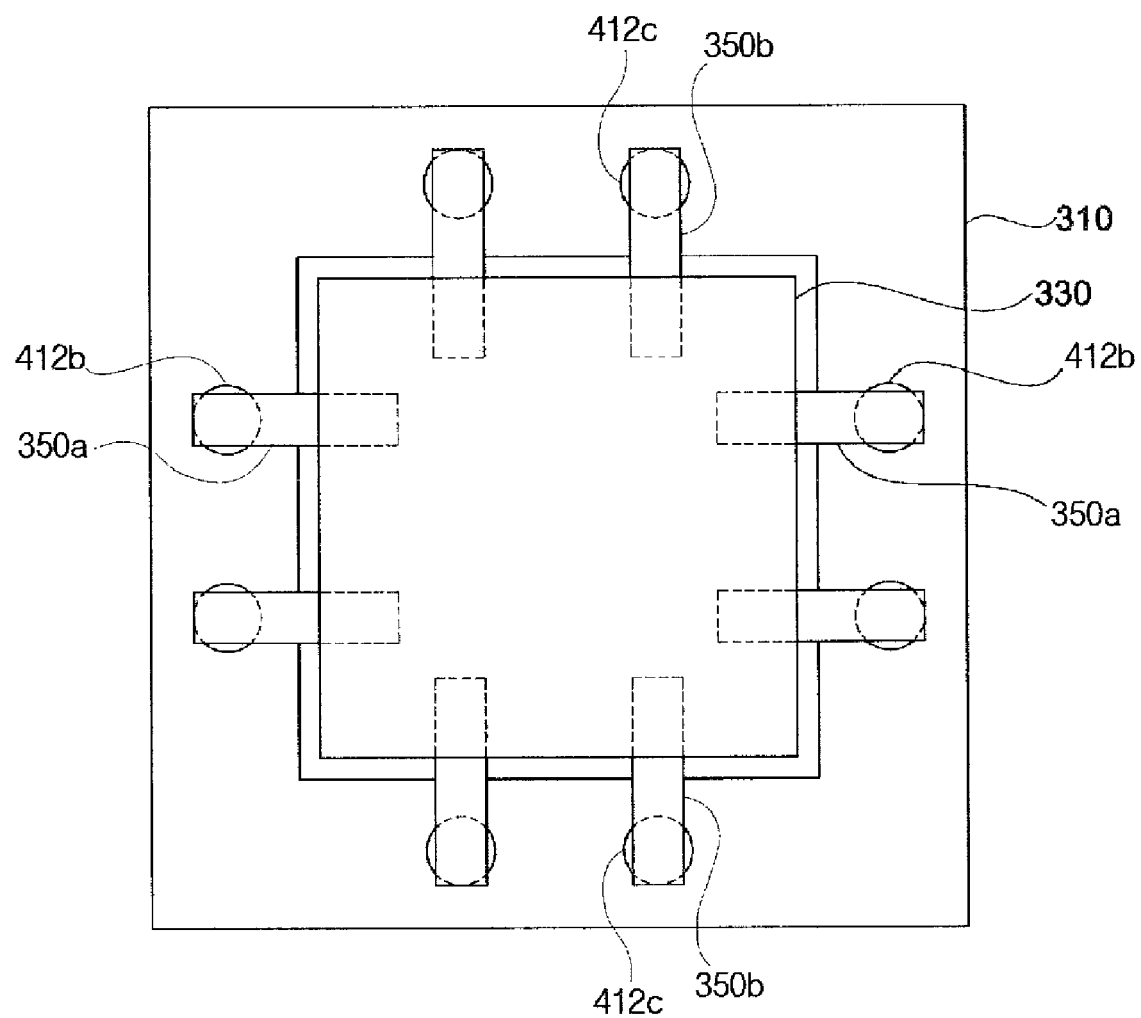
FIG. 5 is a plan view of an upper board and support pins.

As shown in FIG. 5, the substrate bonding apparatus 100 may include a plurality of support pins 350a and 350b. The support pins 350a and 350b may include first support pins 350a connected to one side of the upper board 330 and second support pins 350b connected to the other side of the upper board 330. The first support pins 350a may be arranged substantially perpendicular to the second support pins 350b. A plurality of push rods 412b and 412c may support the first and second support pins 350a and 350b, respectively. The push rods 412b and 412c may include first push rods 412b to support the first support pins 350a and second push rods 412c to support the second support pins 350b.

In the upper end of each of the first push rods 412b, a first groove may be formed to receive the corresponding first support pin 350a. The first groove may be substantially parallel to the corresponding first support pin 350a. In the upper end of each of the second push rods 412c, a second groove may be formed to receive the corresponding second support pin 350b. The second groove may be substantially parallel to the corresponding second support pin 350b. The first grooves prevent the first support pins 350a from moving in the direction substantially perpendicular to the first support pins 350a, and the second grooves prevent the second support pins 350b from moving in the direction substantially perpendicular to the second support pins 350b. Consequently, it is possible to prevent the upper board 330 from moving up and down or from side to side when the distance between the substrates P1 and P2 is adjusted by the upward or downward movement of the upper board 330. Also, it is possible to move the upper board 330 upward or downward while uniformly maintaining the distance between the substrates P1 and P2.

The number of support pins 350 and push rods 412 provided may be one or more, and the number of the support pins 350 and the push rods 412 is not particularly limited.

Figure 6:
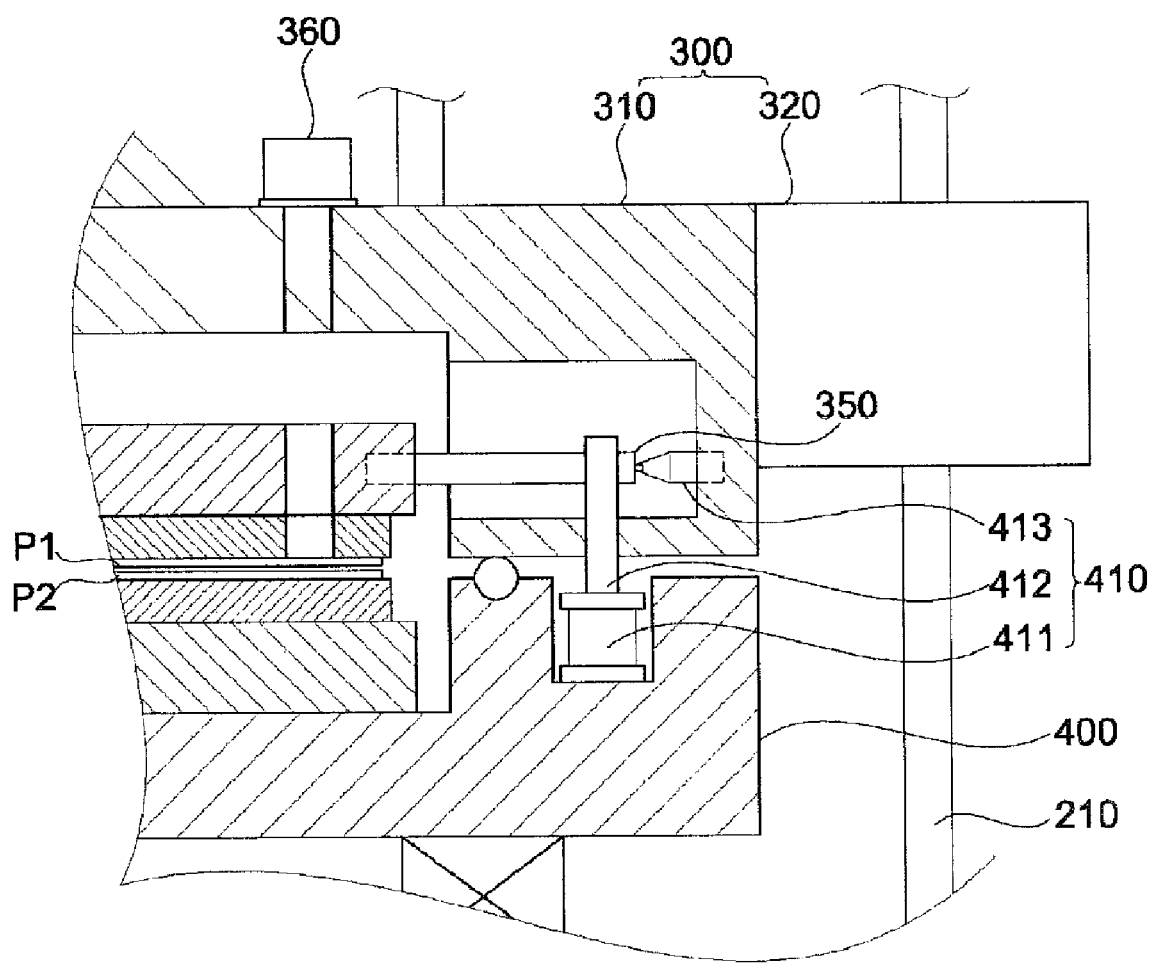
FIG. 6 is front sectional view of an interior structure of another distance adjustment device of the substrate bonding apparatus as embodied and broadly described herein.
Figure 7:
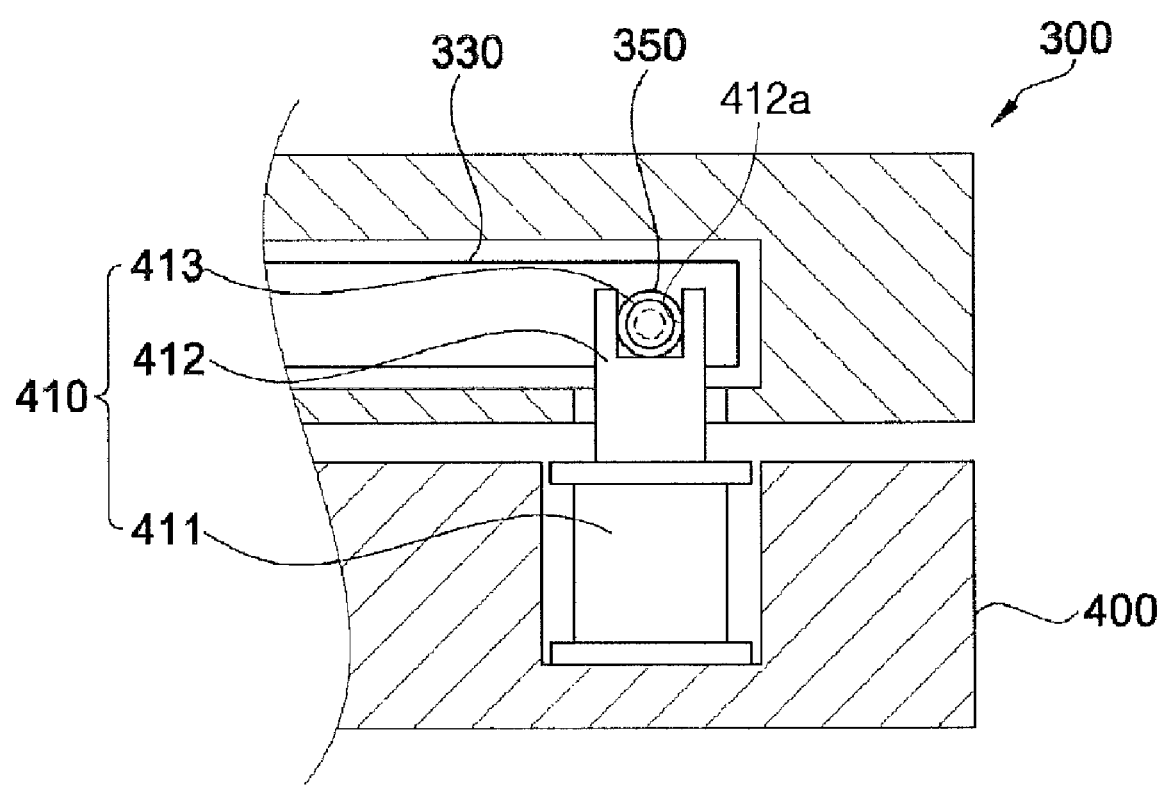
FIG. 7 is a side sectional view of the distance adjustment device shown in FIG. 6.
Figure 8A:
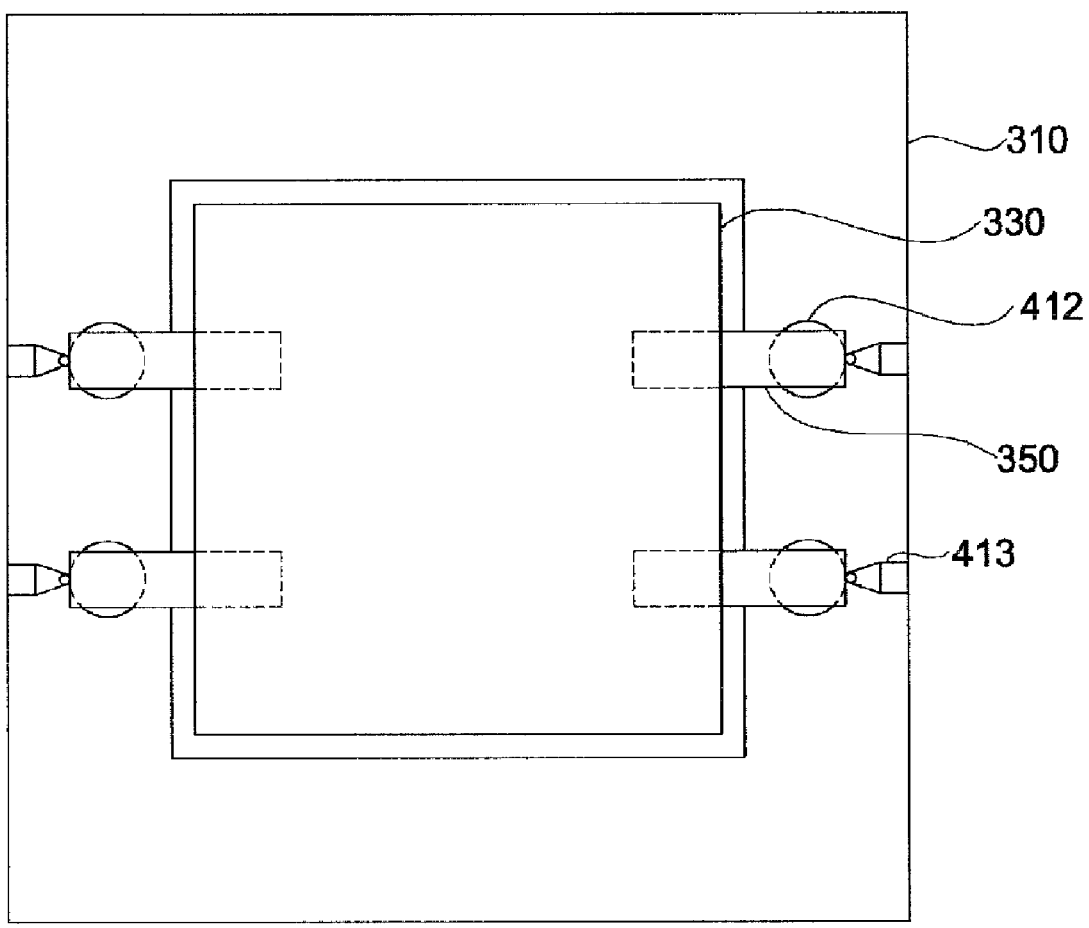
FIGS. 8A and 8B are plan views of an upper board and support pins.
Figure 8B:
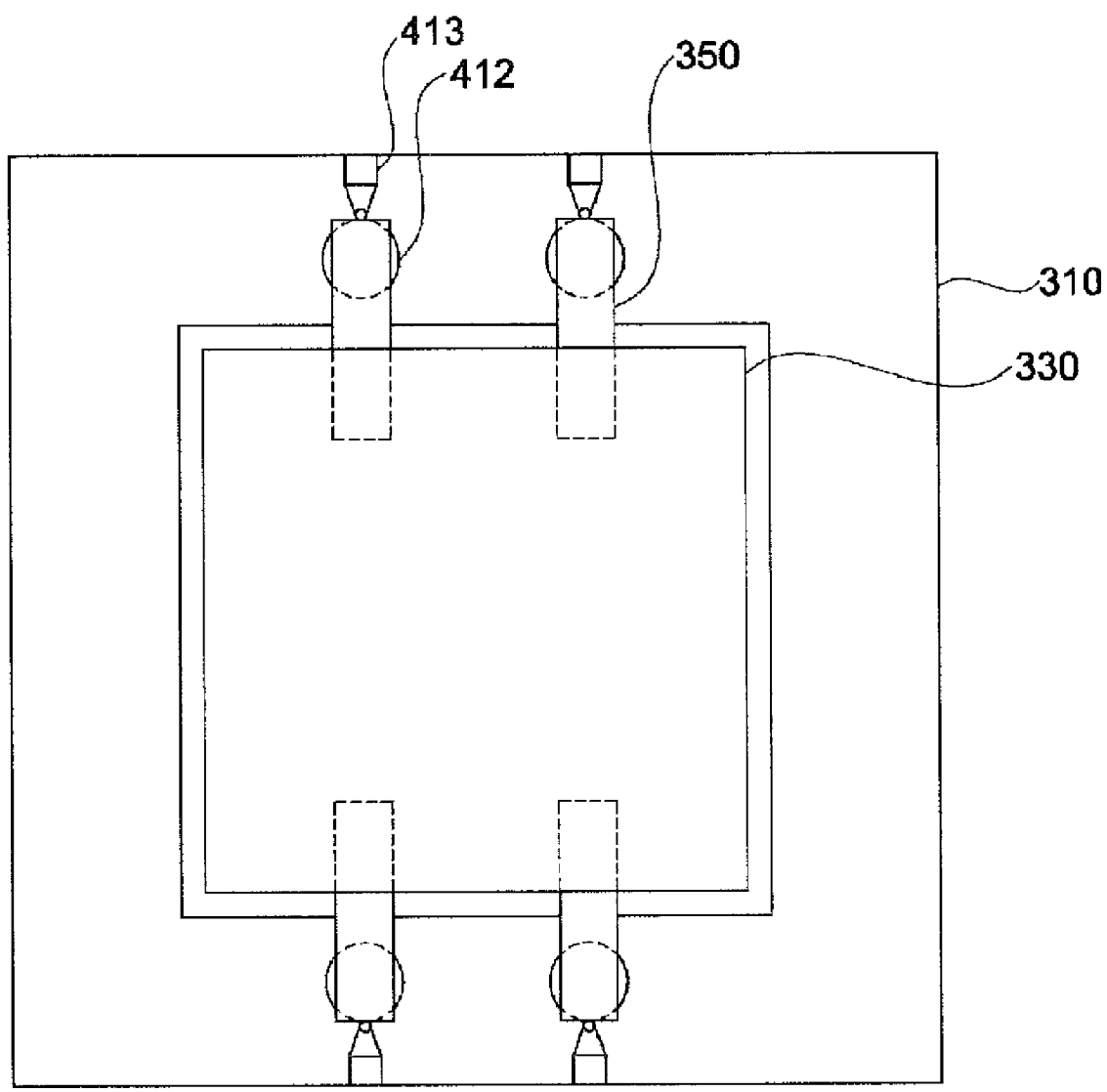

FIG. 6 is front sectional view of an interior structure of a distance adjustment device 410 in accordance with another embodiment as broadly described herein, FIG. 7 is a side sectional view of this distance adjustment device 410, and FIGS. 8A and 8B are plan views of an upper board and support pins associated with this embodiment.

The distance adjustment device 410 shown in FIGS. 6-7 supports a plurality of support pins 350 provided at the upper board 330, and includes an actuator 411, a push rod 412, and an elastic member 413. The actuator 411 may be installed at the edge of the lower chamber 400 to move the push rod 412 upward or downward to move a corresponding support pin 350 upward or downward.

In the upper end of the push rod 412, a groove 412a may be formed to receive the support pin 350 at the upper board 330. The groove 412a may be oriented in the longitudinal direction of the support pin 350 and the substrates P1 and P2, and substantially parallel to one side of the second substrate P2 fixed to the lower board 420 (or substantially parallel to the support pin 350 or one side of the first substrate P1). Consequently, the push rod 412 may prevent the support pin 350 from moving in the direction substantially perpendicular to the support pin 350. Although the groove 412a in the embodiment shown in FIG. 7 is formed in the upper end of the push rod 412, the groove is not limited to this structure. The shape of the upper end of the push rod 412 may be modified so long as the support pin 350 is prevented from moving in the direction substantially perpendicular to the support pin 350.

As shown in FIG. 8A, the elastic member 413 may be located at the end of the support pin 350 to provide an elastic force to the support pin 350 in the direction toward the upper board 330. The elastic force may be substantially parallel to the support pin 350. The elastic members 413 disposed at the left and right sides of the upper board 330 may prevent the support pins 350 from moving in the direction substantially parallel to the support pins 350.

The elastic members 413 may be, for example, ball plungers. When the support pins 350 are moved upward or downward by the actuators 411, the support pins 350 may also move upward or downward in contact with balls of the respective ball plungers 413, making it possible to prevent the support pins 350 from moving in the longitudinal direction.

Referring to FIGS. 8A and 8B, the number of the support pins 350 may be greater than one, and the support pins 350 may be installed along a first side of the upper board 330 and along a second side of the upper board 330 parallel to the first side of the upper board 330. Also, the support pins 350 may be installed at corresponding positions on the first and second sides of the upper board 330. Since the support pins 350 are supported by respective push rods 412, the support pins 350 cannot move in the direction substantially perpendicular to the support pins 350. Also, the support pins 350 cannot move in the direction substantially parallel to the support pins 350 due to the respective ball plungers 413. Consequently, the horizontal movement of the support pins 350 is restrained by the push rods 412 and the ball plungers 413. The number of the support pins 350, the push rods 412, and the ball plungers 413 may be one or more, and the number of the support pins 350, the push rods 412, and the ball plungers 413 is not particularly limited.

FIG. 9 is a flow chart of an operation of the substrate bonding apparatus shown in FIG. 18B.

Referring to FIG. 9, the first substrate P1 and the second substrate P2 are supplied to a space between the upper chamber 300 and the lower chamber 400 by a substrate supply apparatus (not shown) (S110).

For example, the first substrate P1 may first be supplied and fixed to the upper chuck 340 of the upper board 330 disposed in the upper chamber body 310. When the second substrate P2 is then supplied, the pins 451 provided with the lower chamber 400 may be moved upward from the lower chamber 400 by the actuating members 452, and the second substrate P2 may be supported by the pins 451 between the upper chamber 300 and the lower chamber 400. When the pins 451 are then moved downward by the actuating members 452, the second substrate P2, supported by the pins 451, is also moved downward. At this time, the second substrate P2 may be fixed to the lower chuck 430 of the lower board 420, located at the bottom of the second substrate P2, by an attachment force generated by the lower chuck 430, or by other means as appropriate.

When the first substrate P1 and the second substrate P2 are fixed in place, the lower chamber 400 may be aligned with the upper chamber 300 as the driver 500 moves the lower chamber 400 toward the upper chamber 300 (S120).

The plate 520, which supports the lower chamber 400, is supported by the plurality of movement devices 510, which are independently operable. A vertical position of the plate 520 may be adjusted by the posts 511, which are moved upward or downward by the respective movement members 512. At this time, the camera 360 photographs the alignment marks (not shown) of the first substrate P1 and the second substrate P2 to observe an aligned state of the first substrate P1 and the second substrate P2. As the lower chamber 400 is moved upward or downward by the driver 500, the horizontal position alignment of the lower chamber 400 and the upper chamber body 310 may be carried out by the position adjustment stages 460 disposed between the lower chamber 400 and the plate 520 of the driver 500.

When the position alignment of the lower chamber 400 and the plate 520 of the driver 500 is completed, the top of the lower chamber 400 is brought into tight contact with the bottom of the upper chamber body 310 to form a bonding space in which the first substrate P1 and the second substrate P2 will be bonded (S130). The sealing member 440 may maintain an airtight seal in the interior of the bonding space defined between the upper chamber body 310 and the lower chamber 400.

After the lower chamber 400 is moved to form the bonding space, the distance adjustment device 410 adjusts the distance between the first substrate P1 and the second substrate P2 (S140). That is, when the actuator 411 of the distance adjustment device 410 is operated to maintain a uniform distance between the first substrate P1 and the second substrate P2, the rods 412 that support the support pins 350 move, causing the upper chuck 340 and the upper board 330, to which the first substrate P1 is fixed, to also move downward.

When a predetermined distance is achieved between the first substrate P1 and the second substrate P2, the downward movement of the upper board 330 is stopped, and the exhaust device 600 forms a vacuum in the bonding space (S150). At this time, the distance between the first substrate P1 and the second substrate P2 may be uniformly maintained by the distance adjustment device 410 even as the vacuum pressure in the bonding space is established.

When the vacuum pressure is established in the bonding space, the first substrate P1 may be released by the upper chuck 340 and freely drop to the top of the second substrate P2 such that the first substrate P1 is temporarily bonded to the second substrate P2 (S160).

Pressure may be applied to the temporarily bonded first and second substrates P1 and P2, while an $N_2$ process gas is supplied to the bonding space surrounding the temporarily bonded first and second substrates P1 and P2, such that the first substrate P1 and the second substrate P2 are securely bonded to each other (S170). That is, the pressure difference between the inside and the outside of the temporarily bonded first and second substrates P1 and P2 is increased by increasing the pressure in the bonding space, with the result that the first substrate P1 is bonded to the second substrate P2.

When the bonding of the first substrate P1 and the second substrate P2 is completed, the pressure in the bonding space may be restored to atmospheric pressure, and the bonded substrates are transferred out of the substrate bonding apparatus 100 (S180). The pressure in the bonding space is restored to atmospheric pressure because it is easy to control the pressure, and subsequent substrate transfer works may be performed at atmospheric pressure, and a further process is not necessary.

Although various embodiments have been disclosed for illustrative purposes, those skilled in the art will appreciate that various modifications, additions and substitutions are possible, without departing from the scope and spirit of the disclosure provided herein and the accompanying claims. For example, it is possible to add components having other additional functions to the embodiments as broadly described herein, or to replace the components with other new components. It should be noted, however, that, when other modifications include essential components disclosed herein, such modifications are included in the technical category of the embodiments as broadly described herein.

A substrate bonding apparatus and method as embodied and broadly described herein may prevent the upper board (or the lower board) from shaking when the upper board (or the lower board) is moved toward the lower board (or the upper board). Also, the upper board (or the lower board) may be uniformly moved, thereby maintaining a uniform distance between the substrates. Furthermore, the substrates may be bonded while maintaining a uniform distance between the substrates, thereby reducing a bonded substrate defect ratio.

A substrate bonding apparatus is provided that is capable of preventing an upper board (or a lower board) from shaking when the upper board (or the lower board) is moved toward the lower board (or the upper board).

A substrate bonding apparatus as embodied and broadly described herein may include a first support member to fix a first substrate at one major surface thereof, a second support member to fix a second substrate at one major surface thereof opposite to the first support member, a support pin located at the outside of the first substrate fixed to the first support member, the support pin being connected to the first support member, and a distance adjustment unit for moving the support pin upward or downward to adjust the distance between the first support member and the second support member.

The support pin may be disposed substantially parallel to one side of the first substrate, and the distance adjustment unit includes a groove formed substantially parallel to one side of the second substrate fixed to the second support member to receive the support pin.

The distance adjustment unit may include a push rod having a groove to receive the support pin, the push rod supporting the support pin received in the groove, and an actuator connected to the push rod to move the push rod upward or downward.

A substrate bonding apparatus as embodied and broadly described herein may include a first support member to fix a first substrate at one major surface thereof, a second support member to fix a second substrate at one major surface thereof opposite to the first support member, a first support pin located at the outside of the first substrate fixed to the first support member, the first support pin being connected to one side of the first support member, a second support pin located at the outside of the first substrate fixed to the first support member, the second support pin being connected to the other side of the first support member substantially parallel to the one side of the first support member, a first chamber having an opening in which the first support member is disposed, the first chamber surrounding the first and second support pins and the first support member, first and second elastic members disposed between the one side of the first support member and the first chamber and between the other side of the first support member and the first chamber, respectively, to provide elastic forces to the first support member in the direction toward the first support member, and a distance adjustment unit for moving the first and second support pins upward or downward to adjust the distance between the first support member and the second support member.

A substrate bonding apparatus as embodied and broadly described herein may include a first support member to fix a first substrate at one major surface thereof, a second support member to fix a second substrate at one major surface thereof opposite to the first support member, a first support pin located at the outside of the first substrate fixed to the first support member, the first support pin being connected to one side of the first support member, a second support pin located at the outside of the first substrate fixed to the first support member, the second support pin being connected to the other side of the first support member substantially perpendicular to the one side of the first support member, and a distance adjustment unit for moving the first and second support pins upward or downward to adjust the distance between the first support member and the second support member.

Any reference in this specification to "one embodiment," "an embodiment," "example embodiment," "certain embodiment," "alternative embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A substrate bonding apparatus, comprising:
a first support member;
a first board movably provided within the first support member, wherein the first board receives a first substrate on a receiving surface thereof;
a second support member provided opposite the first support member so as to define a bonding space therebetween, wherein the second support member receives a second substrate on a receiving surface thereof;
at least one support pin that extends horizontally outward from an outer side edge of the first board and into a corresponding at least one receiving space formed in the first support member, wherein the at least one receiving space comprises at least one recess formed in a corresponding interior lateral wall of the first support member, and wherein the at least one support pin provides for vertical movement of the first substrate relative to the second support member; and
a distance adjustment device that selectively moves the at least one support pin upward or downward to adjust a distance between the first support member and the second support member, wherein each distance adjustment device comprises:
a push rod having a groove formed in a first end thereof to receive and support an end of a respective support pin, wherein the groove is positioned substantially parallel to a longitudinal axis of the support pin such that outer walls of the groove restrict transverse movement of the support pin positioned therein.

2. The substrate bonding apparatus of claim 1, wherein the first support member comprises:
a first chamber, wherein the first board is movably coupled in the first chamber; and
a first chuck coupled to the first board, wherein the first chuck defines the receiving surface of the first board of the first support member, and wherein the second support member comprises:
a second chamber;
a second board coupled to the second chamber; and
a second chuck coupled to the second board, wherein the second chuck defines the receiving surface of the second support member.

3. The substrate bonding apparatus of claim 2, wherein the at least one support pin comprises at least two support pins that extend horizontally outward from opposite outer side edges of the first board and into corresponding receiving spaces formed in the first chamber.

4. The substrate bonding apparatus of claim 3, wherein the distance adjustment device comprises at least two distance adjustment devices provided with the second chamber at positions corresponding to the at least two support pins, wherein each distance adjustment device further comprises:
an actuator coupled to a second end of the push rod, wherein the actuator selectively moves the push rod upwards or downwards.

5. The substrate bonding apparatus of claim 4, wherein the push rod extends out of the second chamber and through a through hole in the first chamber into the receiving space formed in the first chamber so as to support the end of the support pin, and wherein the support pin and the first board coupled thereto move upward or downward within the first chamber in response to a corresponding movement of the push rod by the actuator.

6. The substrate bonding apparatus of claim 4, wherein each distance adjustment device further comprises an elastic member positioned between a side wall of the receiving space and the end of the support pin positioned therein, wherein the elastic member restricts longitudinal movement of the support pin within the groove, and opposite side walls of the groove restrict transverse movement of the support pin within the groove.

7. The substrate bonding apparatus of claim 4, wherein the at least two support pins comprises at least one support pin extending outward from each of four side edges of the first board and into corresponding receiving spaces formed in the first chamber, and wherein the at least two distance adjustment devices comprises at least one adjustment device provided for each support pin.

8. The substrate bonding apparatus of claim 1, wherein the at least one support pin extends substantially parallel to a longitudinal direction of the receiving surface of the first support member, the first board, and the first substrate received thereon, and the distance adjustment device includes a groove formed substantially parallel to the support pin so as to receive the support pin therein and restrict transverse movement of the support pin.

9. A substrate bonding apparatus, comprising:
a first chamber positioned opposite a second chamber so as to define a bonding space therebetween;
a first support member positioned within the first chamber so as to receive and hold a first substrate;
a second support member positioned within the second chamber so as to receive and hold a second substrate opposite the first substrate;
first and second support pins that extend horizontally outward from opposite first and second side edges of the first support member, respectively, and into corresponding first and second receiving spaces, respectively, formed as recesses that extend into opposite lateral side walls of the first chamber; and
a distance adjustment device coupled to the first and second support pins so as to selectively raise and lower the first and second support pins and adjust a position of the first support member coupled thereto, wherein the distance adjustment device comprises:
first and second push rods corresponding to the first and second support pins, the first and second push rods each having a first end with a groove formed therein that extends into its respective receiving space so as to receive and support an end of its respective support pin.

10. The substrate bonding apparatus of claim 9, further comprising first and second elastic members respectively positioned in the first and second receiving spaces between the first support member and the first chamber, wherein the first and second elastic members exert an elastic force on the first support member so as to maintain a position of the first support member within the first chamber.

11. The substrate bonding apparatus of claim 10, wherein the first elastic member is positioned between a distal end of the first support pin and the first chamber, and the second elastic member is positioned between a distal end of the second support pin and the second chamber, and wherein the first and second elastic members exert an elastic force on the first and second support pins that maintains a horizontal position of the first support member in the first chamber.

12. The substrate bonding apparatus of claim 9, wherein the distance adjustment device is provided with the second support member, and wherein the distance adjustment device further comprises:

first and second actuators respectively coupled to a second end of the first and second push rods, wherein the first and second actuators raise and lower the first and second push rods so as to raise and lower the first and second support pins supported in the grooves and adjust a position of the first support member connected thereto relative to the second support member.

13. The substrate bonding apparatus of claim 12, wherein the first and second support pins extend substantially parallel to a longitudinal axis of the first substrate supported by the first support member, and the grooves formed in the first and second push rods extend substantially parallel to a longitudinal axis of the second substrate.

14. The substrate bonding apparatus of claim 13, wherein the groove formed in the first and second push rods is substantially parallel to the first and second support pins received therein, and wherein opposite side walls of the groove restrict transverse movement of the first and second support pins within the grooves.

* * * * *